(12) United States Patent
Figueira et al.

(10) Patent No.: US 8,385,355 B1
(45) Date of Patent: Feb. 26, 2013

(54) E-TREES OVER MPLS AND PBB-TE NETWORKS

(75) Inventors: Norival R. Figueira, Campbell, CA (US); Richard D. Gitlin, Little Silver, NJ (US)

(73) Assignee: Brixham Solutions Ltd, Tortola (VG)

( * ) Notice: Subject to any disclaimer, the term of this patent is extended or adjusted under 35 U.S.C. 154(b) by 570 days.

(21) Appl. No.: 12/290,463

(22) Filed: Oct. 29, 2008

Related U.S. Application Data

(60) Provisional application No. 61/002,414, filed on Nov. 7, 2007.

(51) Int. Cl.
*H04L 29/06* (2006.01)
*H04L 12/44* (2006.01)

(52) U.S. Cl. .......... 370/401; 370/386; 370/395.53; 370/408; 370/467

(58) Field of Classification Search .................. None
See application file for complete search history.

(56) References Cited

U.S. PATENT DOCUMENTS

| | | | |
|---|---|---|---|
| 7,688,756 B2 | 3/2010 | Allan | |
| 2002/0038253 A1* | 3/2002 | Seaman et al. | 709/238 |
| 2004/0037279 A1 | 2/2004 | Zelig | |
| 2004/0042454 A1 | 3/2004 | Zabihi | |
| 2004/0081171 A1 | 4/2004 | Finn | |
| 2004/0170173 A1 | 9/2004 | Pan | |
| 2005/0013297 A1 | 1/2005 | Eriksson | |
| 2005/0044262 A1 | 2/2005 | Luo | |
| 2005/0169270 A1 | 8/2005 | Mutou et al. | |
| 2006/0029032 A1 | 2/2006 | Allan | |
| 2006/0047851 A1 | 3/2006 | Voit | |
| 2006/0187950 A1 | 8/2006 | Bou-Diab | |
| 2006/0245436 A1 | 11/2006 | Sajassi | |
| 2007/0008982 A1 | 1/2007 | Voit | |
| 2007/0086361 A1 | 4/2007 | Allan | |
| 2008/0101390 A1 | 5/2008 | Hu | |
| 2008/0172497 A1 | 7/2008 | Mohan | |
| 2008/0212595 A1 | 9/2008 | Figueira | |
| 2008/0219268 A1 | 9/2008 | Dennison | |
| 2008/0279196 A1 | 11/2008 | Friskney | |
| 2009/0168783 A1* | 7/2009 | Mohan et al. | 370/395.5 |

OTHER PUBLICATIONS

Imtech, Welcome to Imtech Telecom-Future Networks, Oct. 9, 2007.
Belcher, Adrian, World Wide Packets, The Merits of Metro/Carrier Ethernet Transport Technologies, Mar. 8, 2007.
Bottorff et al., Business Made Simple, Nortel, Provider Backbone Transport, Jul. 2006.
Sajassi, et al., VPLS interoperability with Provider Backbone Bridges, Mar. 2007.
Allan, D. et al, Provider Link-State Bridging, IEEE Communications Magazine, Sep. 2008.

* cited by examiner

*Primary Examiner* — Marsha D. Banks Harold
*Assistant Examiner* — Matthew Campbell

(57) ABSTRACT

An E-Tree is disclosed which includes a root node associated with a Metro Ethernet network. The E-Tree includes a first Virtual Bridge (VB), associated with the root node, which is configured to process Ethernet traffic, and a second node associated with the Metro Ethernet network. The E-Tree includes a second VB, associated with the second node, configured to process Ethernet traffic and having a first connection between the first VB and the second VB. The second VB is configured to be able to send Ethernet traffic to the first VB via the first connection, if appropriate. In the event there is a second connection between the second VB and a third VB and the second connection has been assigned a down direction from the point of view of the second VB, the second VB is not permitted to send traffic received from the second connection to another connection which from the point of view of the second VB has been assigned a down direction.

26 Claims, 10 Drawing Sheets

E-TREES OVER MPLS AND PBB-TE NETWORKS

CROSS REFERENCE TO OTHER APPLICATIONS

This application claims priority to U.S. Provisional Patent Application No. 61/002,414 entitled E-TREES OVER MPLS AND PBB-TE NETWORKS filed Nov. 7, 2007 which is incorporated herein by reference for all purposes.

BACKGROUND OF THE INVENTION

Ethernet is an attractive networking technology for service providers. For example, given the relative ubiquity of Ethernet devices and their simplicity, Ethernet is expected to be cheaper for operators to deploy when compared to traditional technologies such as SONET/SDH. The Metro Ethernet Forum (MEF) is responsible for Carrier Ethernet services standardization and has defined multiple basic carrier-class Ethernet service types, including Ethernet E-Tree (also referred to as E-Tree) for point-to-multipoint services. However, the MEF is transport agnostic and does not define how E-Tree services are implemented.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
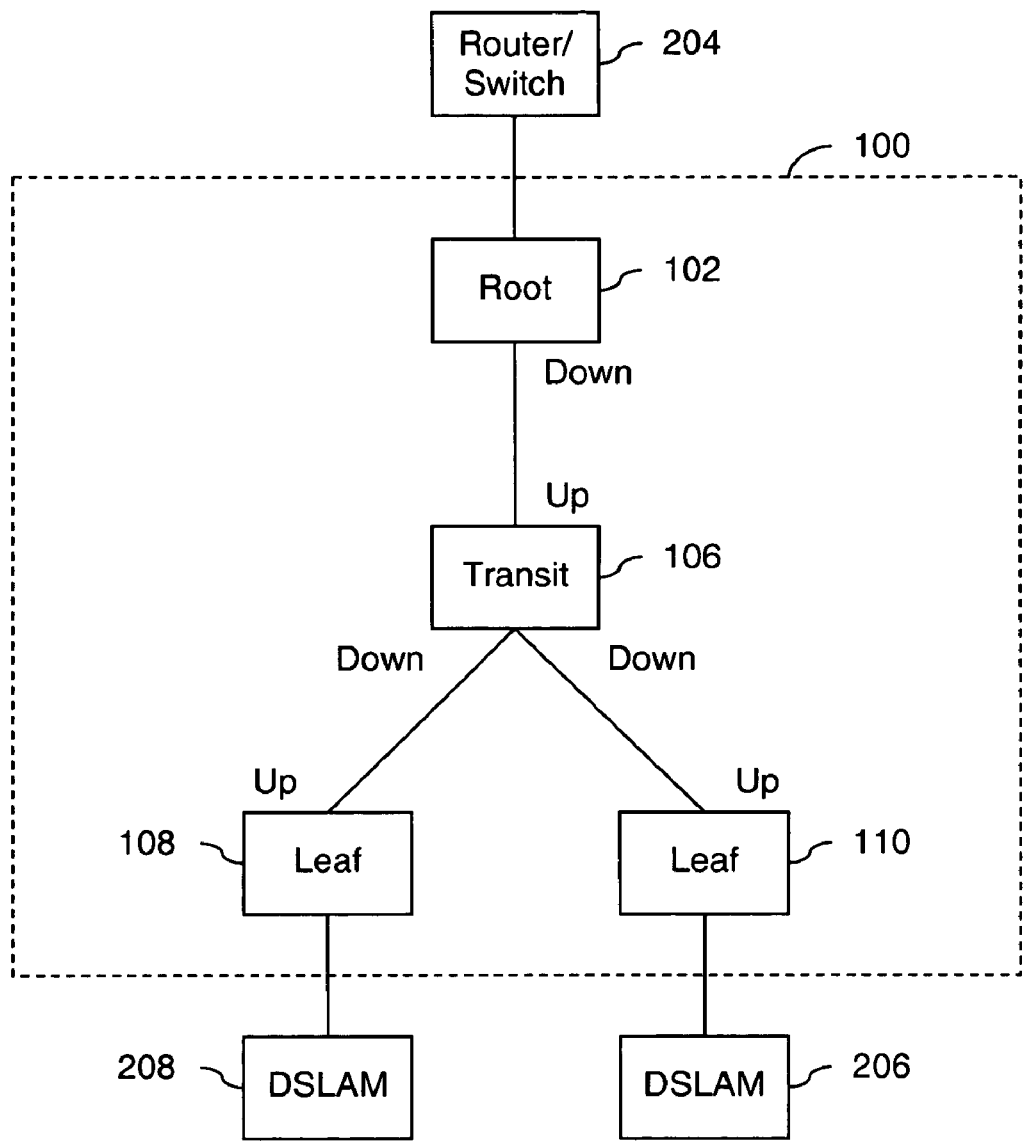
FIG. 1 is a diagram showing an embodiment of an E-Tree.

FIG. 1 is a diagram showing an embodiment of an E-Tree. In the example shown, E-Tree 100 includes root 102, transit node 106, and leaves 108 and 110. A root is sometimes referred to as a root node and a leaf is sometimes referred to as a leaf node. In the example shown, root 102 is connected to transit node 106. Transit node 106 is in turn connected to leaf nodes 108 and 110.

An E-Tree, such as E-Tree 100, is characterized by point to multipoint topology. That is, data (e.g., encapsulated in a frame or packet) is exchanged strictly from one or more leaves through the root or vice versa. For example, communication between 208 and 206 without passing through root node 102 is not permitted (e.g., direct communication through 108, 106, and then 110 is not permitted). If communication from 208 to 206 is desired, the E-Tree sends the data to 204 using leaf 108, transit node 106, and leaf 110. In some embodiments, router/switch 204 or a process on 204 determines whether to send the communication or data down to 206. If proper or acceptable, data is sent from device 204 to 206 via root 102, transit node 106, and leaf 110.

In this particular example, device 204 is a router or a switch and devices 206 and 208 are IP DSLAMs. In various embodiments, devices 204, 206, and 208 are some other type of device configured to exchange traffic with the E-Tree.

To enforce such handling, each connection for a given node is assigned or otherwise associated with a direction. For root 102, the connection towards transit node 106 is down. For root 102, the connection towards router/switch 204 is up. For transit node 106, the connection towards root 102 is up. For transit node 106, the connection towards leaf 108 and leaf 110 is down. For leaf 108, the connection to transit node 106 is in the up direction, as is the connection for leaf 110 to transit node 106. For leaf 108, the connection to 208 is down. For leaf 110, the connection to 206 is down.

The direction assigned to a given connection for a given node describes a permitted exchange of data. In general, for traffic received from an up connection, the traffic is permitted to be forwarded to up or down connections. For traffic received from a down connection, the traffic is only allowed to be sent to an up connection. For example, if transit node 106 receives data from the up direction (i.e., from root 102), that data is permitted to be sent in the down direction (i.e., towards leaf 108 and/or leaf 110). A permitted exchange or direction does not necessarily mean that data is necessarily exchanged. For example, if transit node 106 receives data directed explicitly towards leaf 108 (e.g., identified by a unicast address reachable through leaf 108), then the data is sent only to leaf 108 and not to leaf 110 even though it is permitted to be forwarded to leaf 110 strictly on the basis of direction. In that particular example, (additional handling rules apply relating to unicast handling) and a copy is not sent to leaf 110. By controlling the permitted sending of traffic using directions, traffic cannot be directly sent from one leaf to another, but the root can send traffic to any leaf. In some embodiments, (proper) handling of traffic based on one or more assigned directions is performed by one or more virtual bridges. Some embodiments are described in further detail below.

In some embodiments, E-Tree 100 extends over a Metro Ethernet area. In some embodiments, E-Tree 100 is implemented over a Multi Protocol Label Switching (MPLS) network. In some embodiments, E-Tree 100 is implemented over a Provider Backbone Bridge Traffic Engineering (PBB-TE) network. In some embodiments, E-Tree 100 uses both MPLS and PBB-TE. In some embodiments, some other types of networks or protocols are used in place of or in addition to MPLS and/or PBB-TE, such as SONET/SDH, WDM, dark fiber, MPLS, etc.

In various embodiments, E-Tree 100 is used to transport a variety of data. In one example application, E-Tree 100 is used to exchange financial data such as stock prices, news about a company, or other information that can have an effect on financial matters or decision making about financial matters. In another example application, E-Tree 100 is used to exchange audiovisual data, such as Internet Protocol Television (IPTV). These are merely some examples and are not intended to be limiting.

Although some figures herein show only a single E-Tree, in some embodiments two or more E-Trees are supported. For example, it may be attractive to have two E-Trees over the same metro network if each E-Tree is associated with a particular type of traffic. In some embodiments, two E-Trees that span the same metropolitan area have different sets of nodes.

Figure 2:
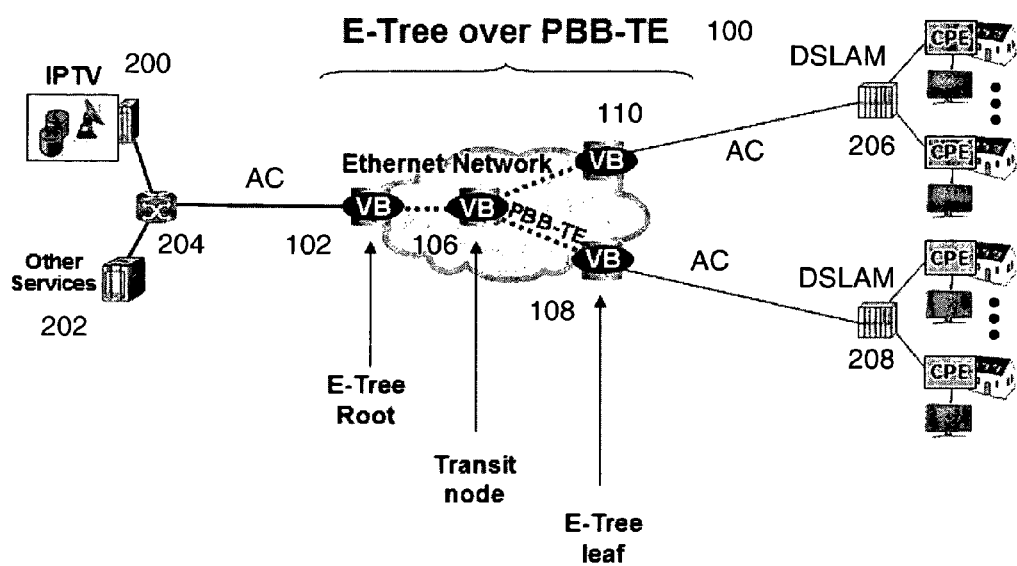
FIG. 2 is a diagram showing an embodiment of a PBB-TE E-Tree.

FIG. 2 is a diagram showing an embodiment of a PBB-TE E-Tree. In the example shown, E-Tree 100 of FIG. 1 is implemented over a PBB-TE network. In some other embodiments, an E-Tree uses some other type of network technology. In the example shown, an E-Tree over PBB-TE uses two types of building blocks (also referred to as devices): a virtual bridge (VB) and a PBB-TE trunk (or more generally, a connection).

In the example shown, a VB is a MAC address learning bridge (e.g., an Ethernet bridge that forwards Ethernet frames using MAC address learning and forwarding techniques). In some embodiments, a VB does not use the Spanning Tree Protocol. Some other names for a MAC learning bridge include Virtual Switching Instances (VSI), Bridging Instances (BI), Bridge Modules (BM), etc. The particular name used herein (i.e., Virtual Bridge) to describe a MAC address learning bridge used to build E-Trees should not limit the scope of this disclosure.

PBB-TE (i.e., IEEE 802.1Qay) is based on IEEE 802.1ah frame format, which defines service instances identified by the I-SID value carried in a frame. A PBB-TE trunk can (if desired) support a plurality of service instances. One example PBB-TE trunk is shown between the VBs associated with nodes 106 and 108. In various embodiments, a PBB-TE E-Tree has PBB-TE trunks which carry the traffic of a single E-Tree or multiple E-Trees. Some examples are described in further detail below. In some embodiments, when carrying the traffic of a single E-Tree, all the service instances inside the PBB-TE trunk are used for a same E-Tree (e.g., the VB simply ignores the I-SID value). In some embodiments, for example when carrying the traffic of multiple E-Trees, the traffic for a particular E-Tree is identified by the PBB-TE service instance (i.e., a particular I-SID value).

In the example shown, an IPTV application is shown. IPTV data is exchanged between IPTV source 200 and one or more downstream nodes. For example, content for one or more IPTV channels originates from IPTV source 200. In the upstream direction, control information (e.g., a desired channel, the home requesting the desired channel, etc.) or other information is sent to IPTV source 200. Device 202 is associated with other services, such as a news or subscription service where current financial information, news, video on demand (VoD) services, or other content is delivered to subscribers. In another example, an E-Tree may be used by a company to distribute company video (e.g., for training, meetings, or news), share files, databases, or other data across various offices of the company.

The IPTV data and other data from device 202 is aggregated at device 204 and is sent over an attachment circuit (AC) to a VB associated with root 102. By "aggregated" it is understood that a downstream device is able to identify the two data streams so that, for example, data can be properly presented to a user.

Within the E-Tree itself, the VB associated with root 102 sends data to the VB associated with transit node 106. That VB in turn sends traffic to the VB associated with leaf 108 and/or the VB associated with leaf 110, as appropriate. In some cases, the VB associated with transit node 106 sends copies of the same frame or traffic to the VB associated with leaf node 108, as well as to the VB associated with leaf node 110. For example, if there is at least one house associated with leaf node 108 watching a particular channel and at least one house associated with leaf node 110 watching the same channel, then both will receive traffic for that channel. Alternatively, the VB associated with transit node 106 may send certain traffic to only one of the VBs associated with leaf nodes 108 and 110. In this particular example, the VB associated with root 102 sends a single copy of a particular frame or piece of traffic to the VB associated with transit node 106 even though both VBs associated with leaf nodes 108 and 110 receive that traffic. This ensures bandwidth is used efficiently and no duplicate copies are sent over the same connection.

At the other end of E-Tree 100, there is an AC between the VB associated with leaf 108 and Digital Subscriber Line Access Multiplexer (DSLAM) 208 and an AC between the VB associated with leaf 110 and DSLAM 206. Each DSLAM connects to one or more houses via Customer Premise Equipment (CPE).

In this example, IPTV content is distributed as appropriate throughout E-Tree 100 using a plurality of multicast addresses. Each IPTV channel is associated with a unique multicast address in this example. For example:

TABLE 1

Example multicast addresses and corresponding channels

| Multicast Address | Channel |
| --- | --- |
| Multicast Address 1 | News Channel |
| Multicast Address 2 | Shopping Channel |
| Multicast Address 3 | Spanish Channel |

If a viewer at one of the houses wants to watch a particular IPTV channel, it is signaled (e.g., up to router/switch 204) using an appropriate control message that a particular house wants to join the corresponding multicast group and traffic for that IPTV channel is sent down to root 102, as appropriate.

In some embodiments, VBs in an E-Tree are configured to perform Internet Group Management Protocol (IGMP) snooping. For example, as a control message is being sent upstream, each VB that handles the control message may examine the control message to determine (for example) what downstream connection, device, or path desires what traffic or multicast address and updates an internal table accordingly. For example, suppose (for simplicity) leaf nodes 108 and 110 each only have one house associated with them. The house associated with leaf 108 is watching the news and the house associated with leaf 110 is watching a home shopping channel. A VB associated with transit node 106 may store an internal table such as this

TABLE 2

Example internal table stored by VB
associated with transit node 106

| Multicast Address | Send to |
| --- | --- |
| Multicast Address 1 (i.e., News Channel) | (Connection to) leaf 108 |
| Multicast Address 2 (i.e., Shopping Channel) | (Connection to) leaf 110 |

In the event a control message is received by the VB associated with transit node 106 indicating the house associated with leaf 110 wants to watch the Spanish channel, the internal table is updated to:

TABLE 3

Example updated internal table stored by VB
associated with transit node 106

| Multicast Address | Send to |
| --- | --- |
| Multicast Address 1 (i.e., News Channel) | (Connection to) leaf 108 |
| Multicast Address 2 (i.e., Shopping Channel) | (Connection to) leaf 110 |
| Multicast Address 3 (i.e., Spanish Channel) | (Connection to) leaf 110 |

Forwarding of traffic by the VB associated with transit node 106 varies accordingly once the internal table is updated. Similarly, a new entry (e.g., if another house comes "on-line" and is associated with one of the leaf nodes) can be added by snooping.

In the example of Table 3, there is a separate signaling message to release a previously reserved channel. Therefore, Table 3 still includes multicast address 2. In this example, a house is requesting the addition of the Spanish channel, but there was no "release" message received for the shopping channel. For example, this may correspond to a situation where a given house has two TV sets: one tuned to the shopping channel and another tuned to the Spanish channel. If a "release" message associated with leaf 110 were received which releases the shopping channel, the corresponding entry in Table 3 would be removed.

In various embodiments, the addresses stored in a table can be MAC addresses or IP addresses; multicast or unicast addresses; and/or static or dynamic multicast addresses. As used herein, a static multicast address is one in which the members of the multicast group cannot leave and/or join as desired. For example, for a subscription service, it may be desirable to use a static multicast address so that non-subscribers cannot receive content without paying for it. For example this can be the case for a financial data (e.g., real-time stock prices) distribution service to stock brokers. For this kind of service distribution, multicast addresses could be statically provisioned. For other applications (e.g., IPTV) a dynamic multicast address provisioning may be appropriate.

As used here, "static" versus "dynamic" refers to how a multicast address is entered into a forwarding table of a VB. Static or dynamic does not refer to any intrinsic property of the multicast address itself. Use of dynamic provisioning of multicast addresses (e.g., with IPTV) allows a service provider to enforce customer subscriptions at TV set top box. For example, a set top box usually has a programmable card that enforces which channels the subscriber can watch according to the particular TV plan subscribed to. The set top box in such embodiments is the one that sends IGMP join and release messages for TV channels. Some other services (e.g., real-time stock price over an E-Tree) are implemented differently in some embodiments because the customer connects a computer (e.g., PC) directly to the E-Tree without a set top box. Thus, the service provider may in such applications prefer to statically provision the E-Tree to make sure only those customers that paid for a given flow (e.g., DOW Jones, NASDAQ, etc.) will receive it.

In some embodiments, the control message may not be sent all the way up to the VB associated with a root. For example, if the VB associated with transit node 106 examines a control message and the desired traffic is already being received at that VB then the control message is discarded since no action is required by any upstream VB (in this case the VB associated with root 100) since the traffic is already being received.

Figure 3:
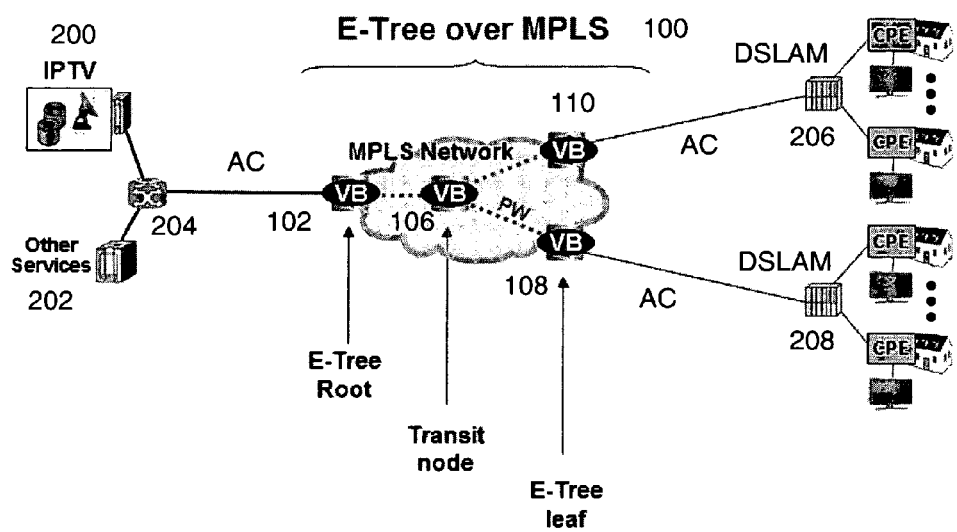
FIG. 3 is a diagram showing an embodiment of a MPLS E-Tree.

FIG. 3 is a diagram showing an embodiment of a MPLS E-Tree. In the example shown, E-Tree 100 of FIG. 1 is implemented over a MPLS network. In some other embodiments, an E-Tree uses some other type of network technology.

As in the PBB-TE E-Tree shown in FIG. 2, the example MPLS E-Tree includes VBs. VBs associated with MPLS have the same functionality as described above in association with PBB-TE E-Trees.

The example MPLS E-Tree also includes a Label Switched Path (LSP) tunnel which is able to support one or more pseudowires (more generally, a connection). Some examples are described in further detail below. In some embodiments, MPLS E-Trees are constructed using pseudowires to carry the traffic of a single E-Tree. For clarity, only the connection of pseudowires to VBs is referred to in some examples described herein and discussion of how LSP tunnels must be in place to carry those pseudowires is not described. The phrase a "pseudowire is connected to a VB" means that (e.g., payload) traffic from a pseudowire is input to a VB at ingress and the egress traffic of the VB is sent out (e.g., as payload) to the pseudowire at egress.

For brevity, the functions performed by the components of the system shown in FIG. 3 are the same, in general, as that shown in FIG. 2. Some technology-specific steps during setup (e.g., setting up a MPLS pseudowire as opposed to a PBB-TE trunk) may be different but once established, the operations of this example MPLS system and that of the example PBB-TE system shown in FIG. 2 are the same.

Figure 4:
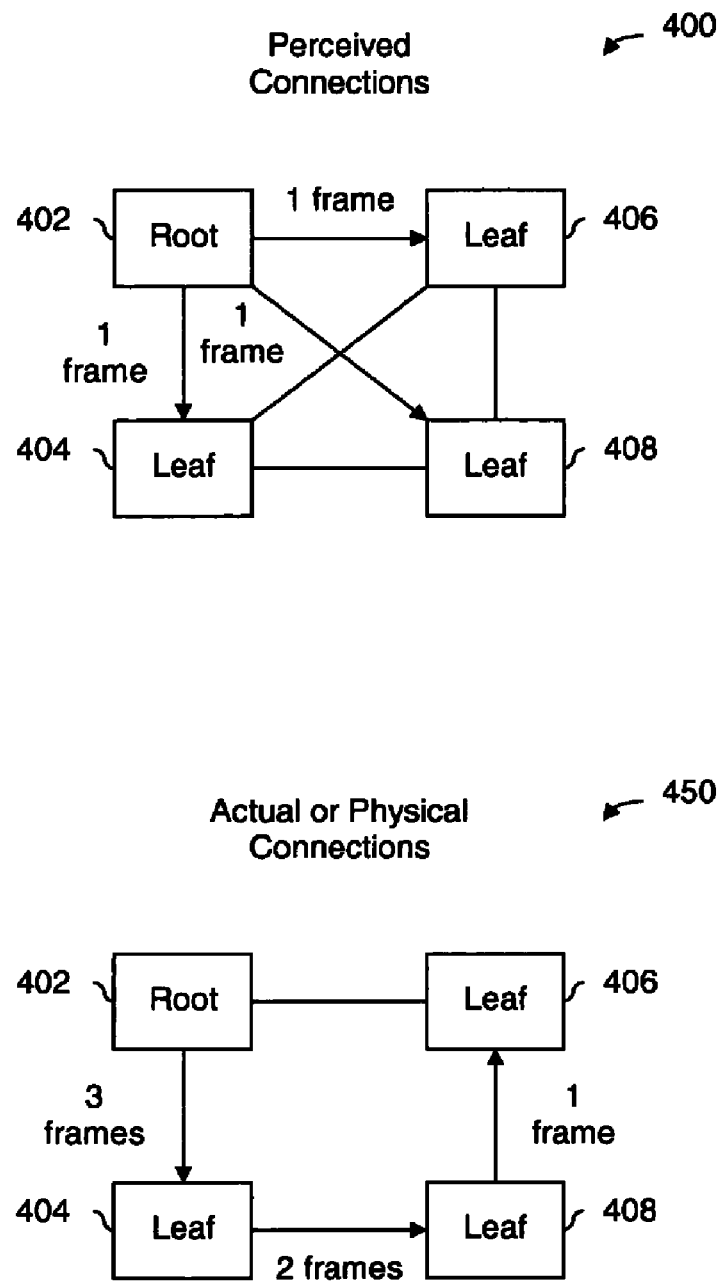
FIG. 4 is a diagram showing an example of another technique for routing data.

FIG. 4 is a diagram showing an example of another technique for routing data. In the example shown, diagram 400 shows the perceived connections and diagram 450 shows the actual or physical connections that are available. In the technique shown, a full mesh is created such that there is a 1-hop (perceived) connection between any two nodes. In some cases, these connections are pseudowires. In reality, a perceived 1-hop connection may require two or more hops and/or may go through another node. Consider, for example, a broadcast frame that is sent from root 402 to leaves 404, 406, and 408. Each broadcast frame is perceived as being sent along a separate or independent connection to each leaf node.

In actuality, the routing may be as shown in diagram 450. In that diagram, three copies of the frame are sent from root 402 to leaf 404, two copies of the frame are sent from leaf 404 to leaf 408, and one copy is sent from leaf 408 to leaf 406.

As shown in this example, the handling of frames using this other technique is inefficient. It is not necessary to send multiple copies of the same frame along the same actual or physical connection. Another issue with the technique shown here is that it is not really an E-Tree. In particular, one leaf is able to communicate directly with another leaf. In a true E-Tree, a communication originating from a leaf passes through any number of transit nodes (if any) and terminates at a root. A communication originating from one leaf is not permitted to pass through or terminate at another leaf.

Figure 5:
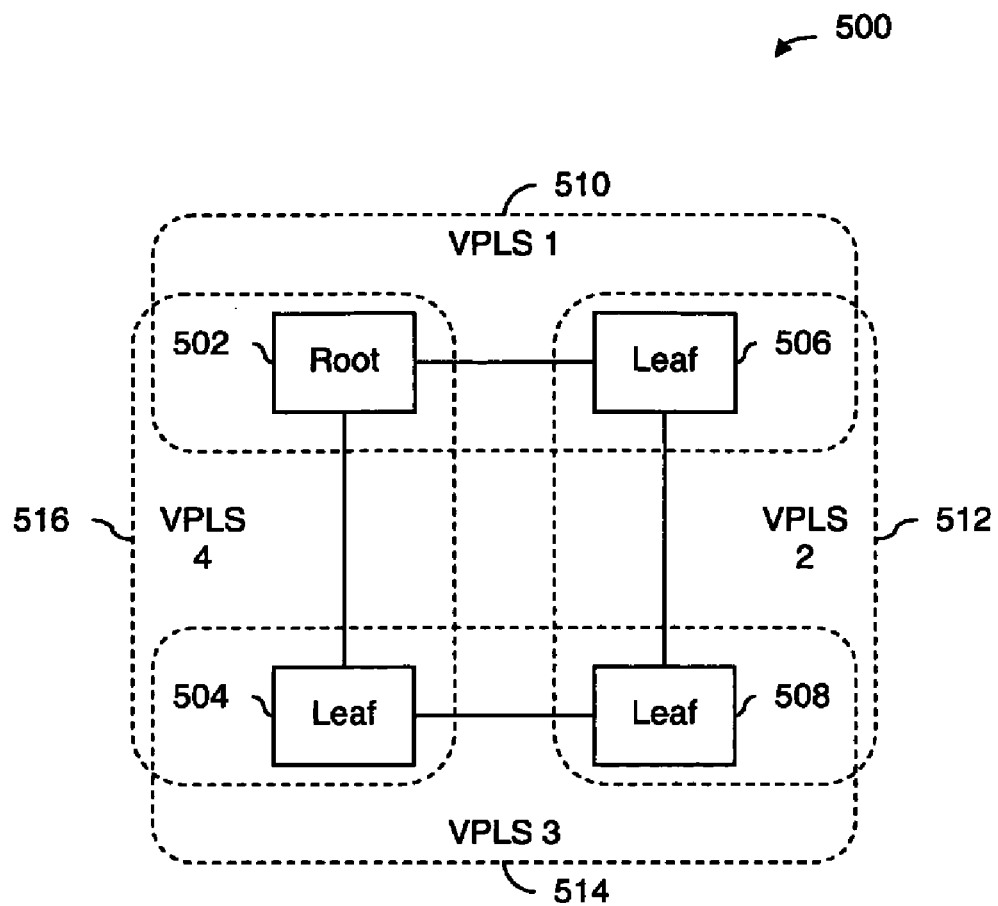
FIG. 5 shows an example of another technique for routing data in a ring topology.

FIG. 5 shows an example of another technique for routing data in a ring topology. In the example shown, system 500 overcomes the inefficient frame handling described above in relation to FIG. 4. In system 500, four Virtual Private LAN Services (VPLS) sessions are established. VPLS 1 (510) includes root 502 and leaf 506; VPLS 2 (512) includes leaf 506 and leaf 508, VPLS 3 (514) includes leaf 504 and leaf 508; VPLS 4 (516) includes root 502 and leaf 504. In the event a broadcast frame is sent from root 502 to leaves 504, 506, and 508 in system 500, only a single copy of the frame is sent along each connection, thus eliminating the inefficient frame routing described above.

In some cases, using the technique shown in system 500 is undesirable. For example, establishing and managing multiple VPLS sessions may be time consuming or annoying to a service provider. Another issue is the technique works only for ring topologies; some real-world systems may have some other topology. For a variety of reasons, some service providers may prefer to use other techniques.

Figure 6:
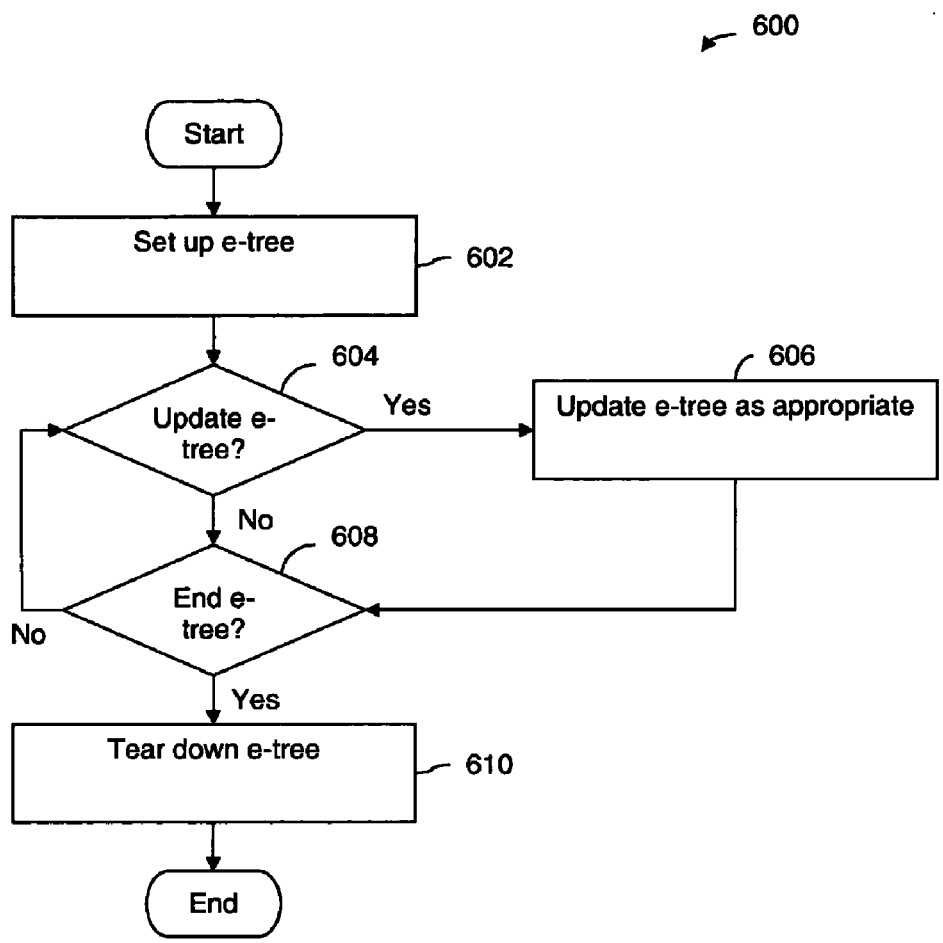
FIG. 6 is a flowchart showing an embodiment of a process for managing an E-Tree.

FIG. 6 is a flowchart showing an embodiment of a process for managing an E-Tree. In the example shown, management process 600 extends over the lifetime of an E-Tree. At 602, an E-Tree is set up. In various embodiments, setting up an E-Tree includes provisioning devices (e.g., a virtual bridge), setting up links or connections, etc. In some cases, the steps performed to set up an E-Tree vary depending upon the network technology used. For example, setting up an E-Tree over MPLS may require a different set of steps than setting up an E-Tree over PBB-TE. Some embodiments of setting up an E-Tree are described in further detail below.

At 604, it is determined whether an E-Tree is to be updated. If so, the E-Tree is updated as appropriate at 606. In some embodiments, updating an E-Tree at 606 includes updating or maintaining one or more tables associated with routing or forwarding. In one example, snooping is used to maintain or update a table. In some embodiments, an address that is snooped is a Media Access Control (MAC) address. In some other embodiments, an address is some other type of address. In some embodiments, updating an E-Tree at 606 includes modifying the topography of an E-Tree, for example by adding or removing nodes. For example, a new leaf node may be connected to root 102 (e.g., so that it is at the same "level" as transit node 106. In another example, leaf 110 is removed from E-Tree 100. Connections and devices are provisioned or removed as appropriate. In some embodiments, provisioning is performed using a control plane (e.g., provided by Soapstone Networks of Billerica, Mass.).

In the event it is not determined to update an E-Tree or after updating an E-Tree at 606, it is determined whether to end an E-Tree at 608. If so, the E-Tree is torn down at 610. In some embodiments, a control plane is used for this task. Otherwise, it is determined at 604 whether the E-Tree is to be updated. In some embodiments, a decision whether or not to end an E-Tree is controlled by a user. For example, an E-Tree may be provisioned by a service provider for a customer and in the event the customer no longer contracts the services of the service provider, the E-Tree is brought down based on the instructions of the service provider.

Figure 7:
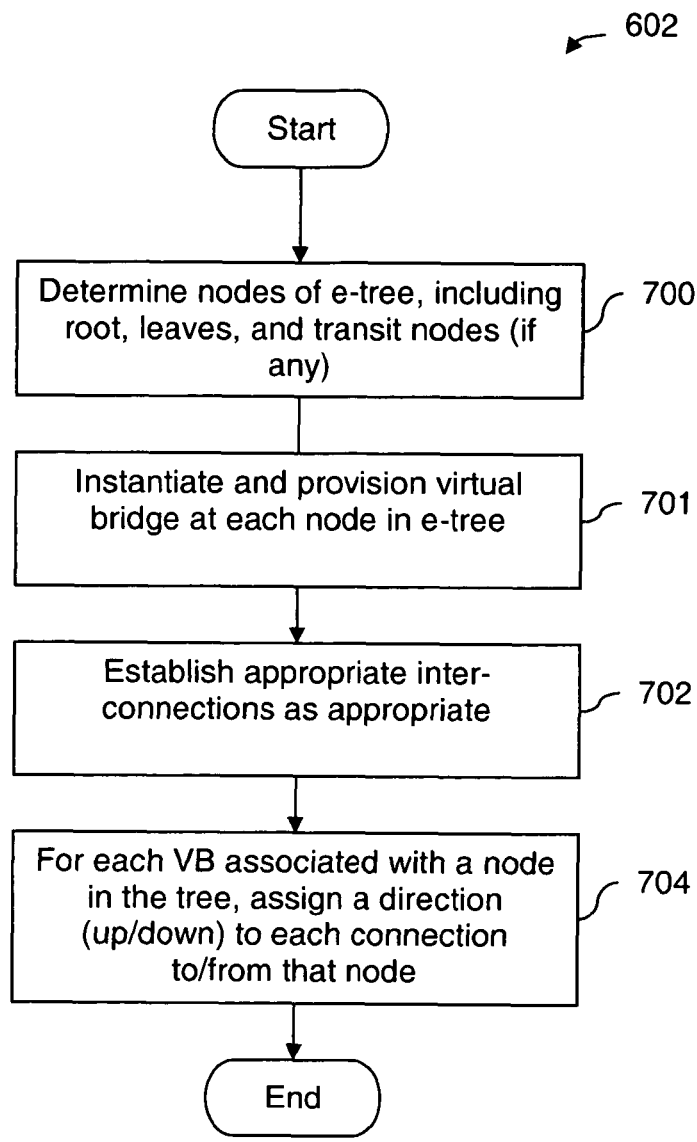
FIG. 7 is a flowchart showing an embodiment of a process to set up an E-Tree.

FIG. 7 is a flowchart showing an embodiment of a process to set up, an E-Tree. In some embodiments, step 602 in FIG. 6 is performed as shown. In some other embodiments, step 602 is performed in some other manner. In various embodiments, an E-Tree being set up is a PBB-TE E-Tree or an MPLS E-Tree.

At 700, nodes of an E-Tree, including root, leaves, and transit nodes (if any) are determined. In some embodiments, this includes obtaining infrastructure information about a service provider's physical topology including locations of switches, connections, etc. In various embodiments, determination of the nodes is done by a person and/or automated software. In one example, a person assigns or determines the root and leaves. The transit node(s), if any, are determined using automated software, such as an E-Tree management or control plane. In some embodiments, nodes are determined or selected in some other manner (e.g., all nodes are selected or assigned manually by a network or traffic expert). In various embodiments, assignment or determination of transit node(s) attempts to eliminate, minimize, or in general reduce the number of links which carry duplicate copies of the same multicast traffic.

At 701, a VB is instantiated and provisioned at each node in an E-Tree. In some embodiments, there is a set or predefined order in which VBs are provisioned. In one example, a process starts at the root, provisions a VB there, moves to a downstream node, etc. Appropriate connections are established as appropriate at 702. In some embodiments, setup of VBs and connections are intermingled or interleaved. Alternatively, in some embodiments, all VBs are set up and then the setup of connections begins.

Figure 8:
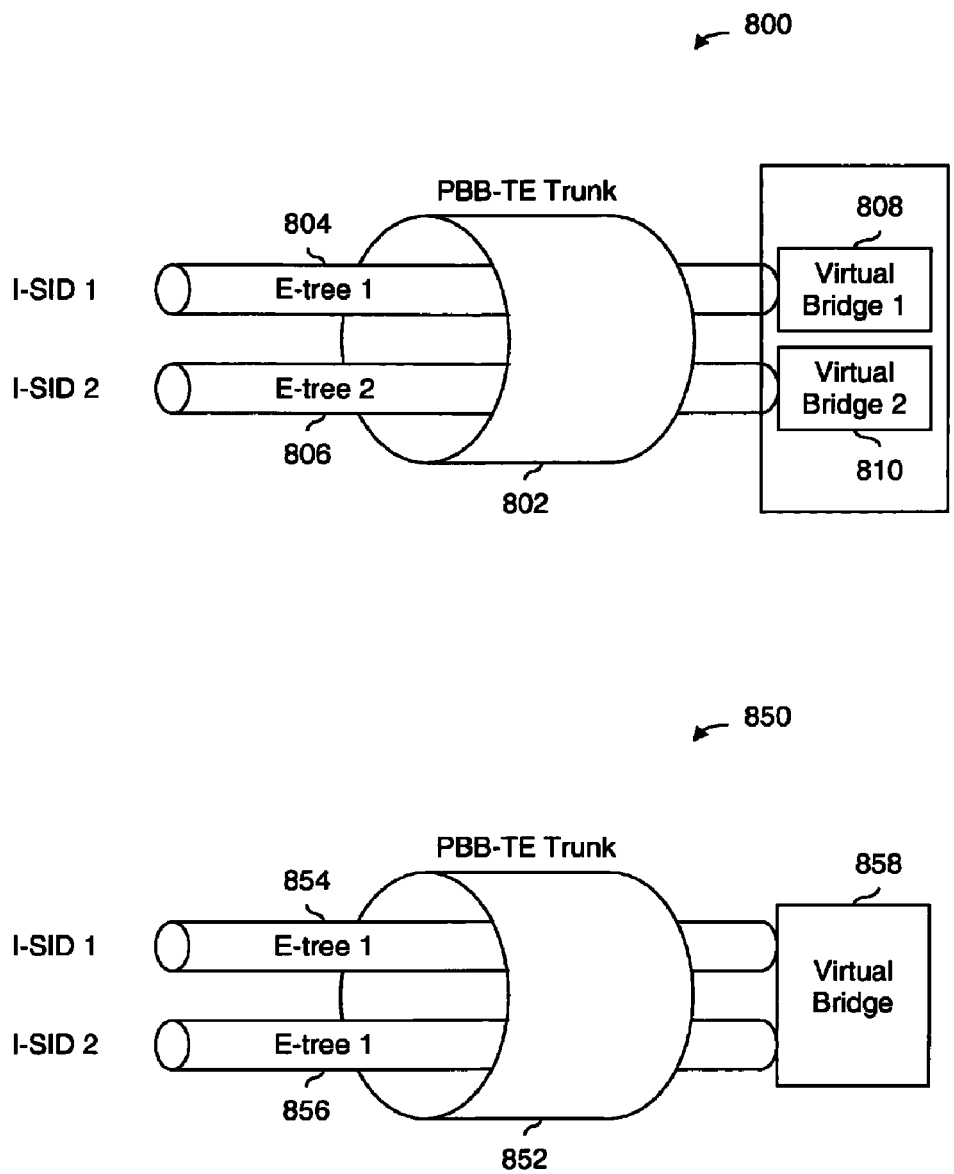
FIG. 8 is a diagram showing two embodiments of PBB-TE trunks and PBB-TE services instances.

FIG. 8 is a diagram showing two embodiments of PBB-TE trunks and PBB-TE services instances. In diagram 800, PBB-TE trunk 802 supports two service instances (804 and 806). As described above, a service instance is defined by or associated with an I-SID value. Service instance 804 is associated with a first E-Tree and traffic associated with that E-Tree is identified by a first I-SID (I-SID 1). The other service instance (806) is associated with another E-Tree and traffic is identified by an I-SID value of I-SID 2. Each E-Tree has its own VB; service instance 804 is connected to VB 808 and service instance 806 is connected to VB 810. In some embodiments, VBs 808 and 810 are associated with the same node or switch.

In diagram 850, PBB-TE trunk 852 includes two services instances (854 and 856), both of which are associated with the same E-Tree. Service instance 854 is associated with an I-SID value of I-SID 1; service instance 856 has an I-SID value of I-SID 2. Both service instances are connected to VB 858.

In some embodiments, VB 858 applies the same processing to traffic (e.g., based on a destination address) regardless of the I-SID value since both I-SID values are associated with the same E-Tree. In some cases, having multiple I-SID values for the same E-Tree is useful for management or monitoring purposes. For example, an administrator may want to measure traffic flow and use different I-SID values to distinguish between different types or sources of traffic.

In general, a given PBB-TE trunk can include any number of service instances, each of which is identified by an I-SID value. Similarly, a given E-Tree can have any number of I-SID values associated with it.

Figure 9:
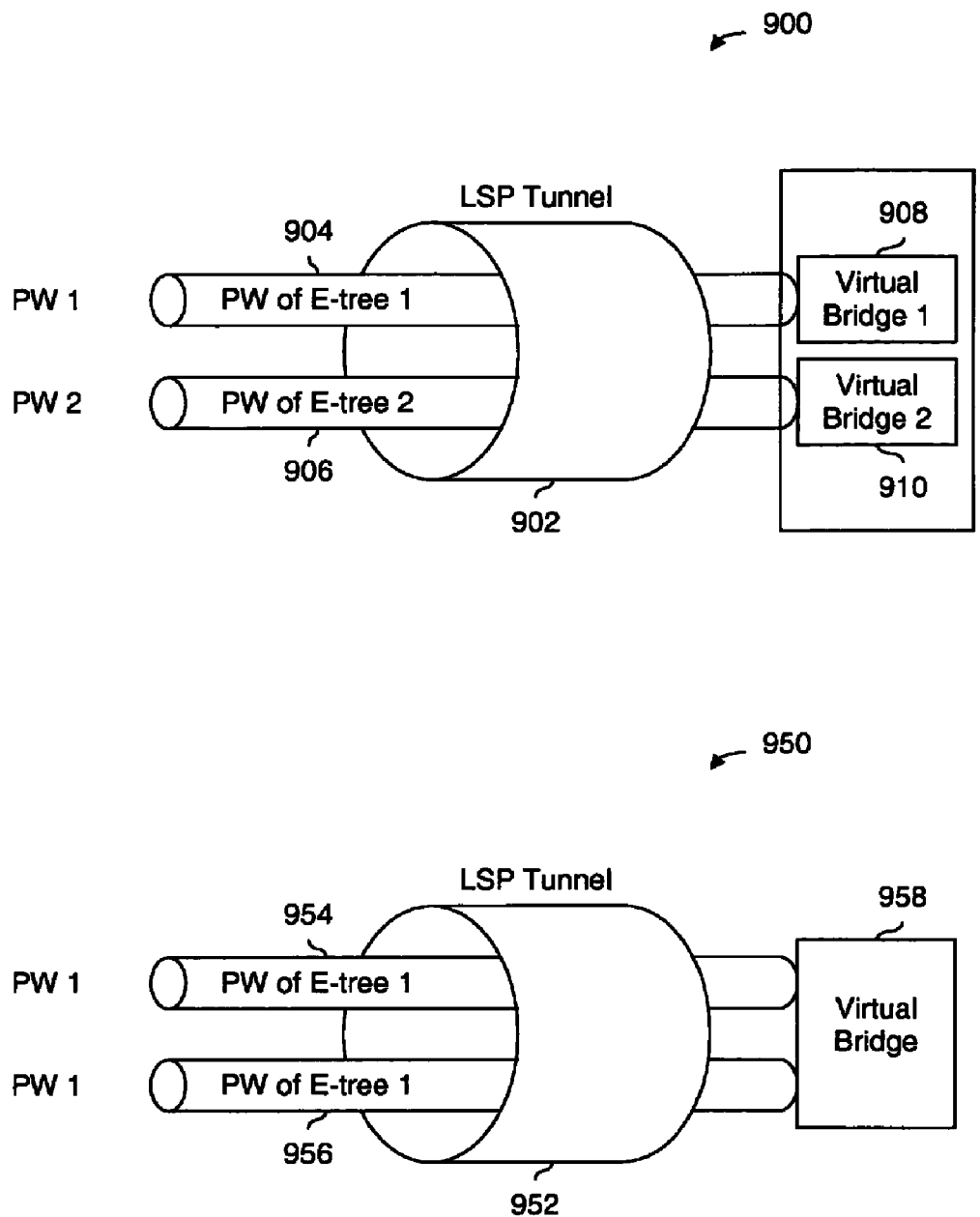
FIG. 9 is a diagram showing an embodiment of an LSP tunnel.

FIG. 9 is a diagram showing two embodiments of an LSP tunnel. In the example shown, LSP tunnel 902 includes two pseudowires (904 and 906). Pseudowire 904 is associated with a first E-Tree and pseudowire 906 is associated with a second E-Tree. Each pseudowire is connected to a respective VB: pseudowire 904 is coupled to VB 908 and pseudowire 906 is coupled to VB 910.

In the second FIG. 950, LSP tunnel 952 includes pseudowires 954 and 956, both of which carry traffic associated with the same E-Tree (i.e., E-Tree 1). VB 958 is connected to pseudowires 954 and 956.

Figure 10:
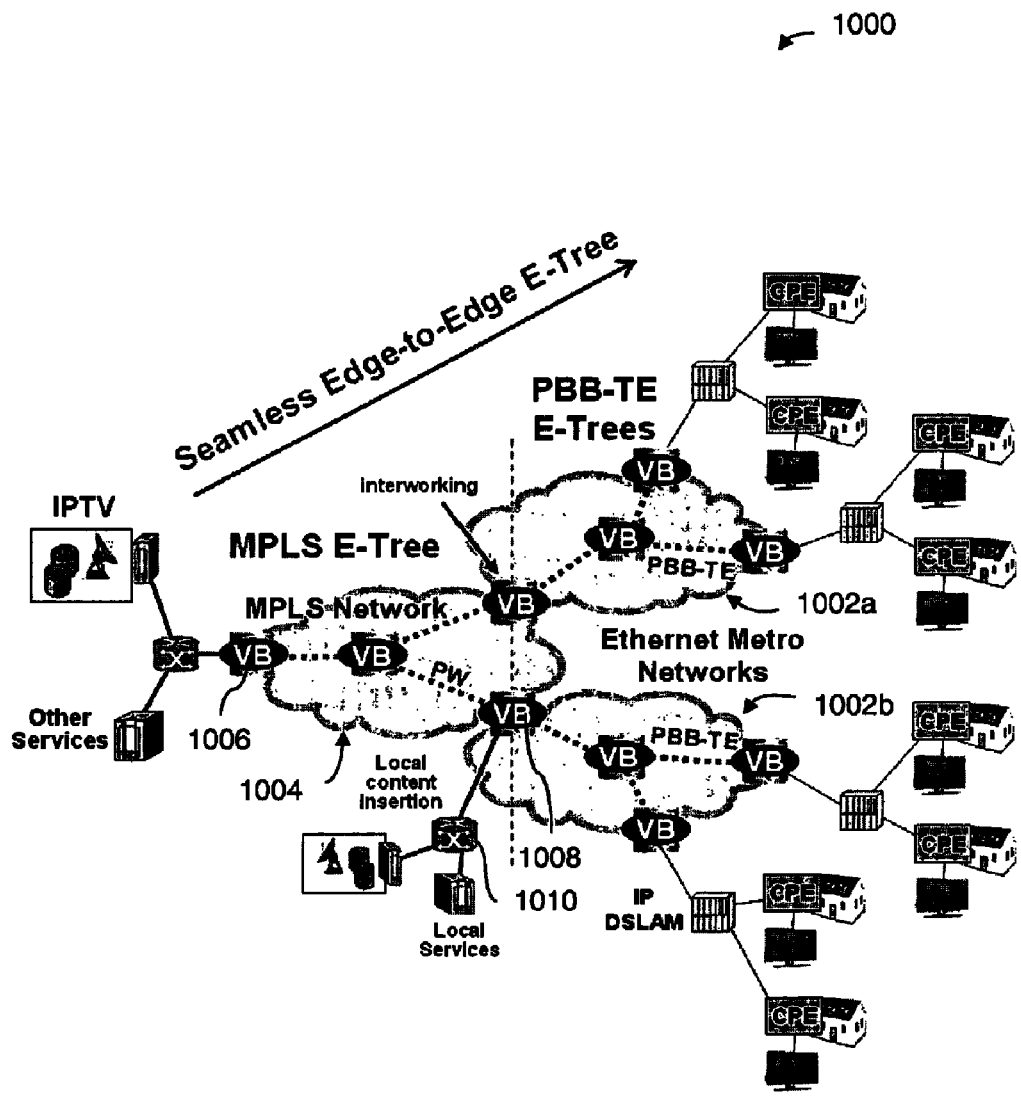
FIG. 10 is a diagram showing an embodiment of an E-Tree running over MPLS and PBB-TE with multiple content insertion points.

FIG. 10 is a diagram showing an embodiment of an E-Tree running over MPLS and PBB-TE with multiple content insertion points. In the example shown, E-Tree 1000 includes two PBB-TE portions (1002a and 1002b) and an MPLS portion (1004).

VBs on the border between a PBB-TE portion and a MPLS portion are referred to interworking virtual bridges (VB). An interworking VB is connected to pseudowires on the MPLS side and PBB-TE trunks on the PBB-TE side. VBs forward based on the Ethernet payload frames contained in Pseudowires or PBB-TE trunks. In some embodiments, if an Ethernet frame is input to the interworking VB, it is forwarded normally to the egress connection. If that egress connection is of a different type from the ingress one, the Ethernet frame is encapsulated as required for that egress connection.

In some embodiments, an interworking VB is configured to interwork MPLS signaling protocols with the PBB-TE management/control plane. For example, one could use the MPLS LDP protocol to carry a "MAC address withdraw" message to optionally signal changes to the MAC address learning tables of VBs, e.g., a signal to clear their MAC learning tables. In such embodiments, if a VB at the border between the MPLS network and the PBB-TE network receives a MAC address withdraw signal from the MPLS network, it sends an equivalent MAC address withdraw signal to the PBB-TE management/control plane, which then directly signals other VBs in the PBB-TE E-Tree to perform the desired action. Similarly, if the PBB-TE management/control plane signals the VB at the border of the MPLS and PBB-TE networks to clear its MAC address table, that VB can send an equivalent MAC address withdraw signal to the VBs in the MPLS network using standard MPLS protocols (e.g., LDP).

Although some examples described herein refer to a PBB-TE management/control plane as a centralized service, the concept is not limited to centralized PBB-TE management/control planes and can alternately use distributed or in-band signaling protocols to provision VBs and PBB-TE trunks and/or to send signaling messages among VBs. One alternate example is Generalized Multiprotocol Label Switching GMPLS (which could be used as a non-centralized PBB-TE management/control plane).

As shown in this example, an E-Tree can (if so desired) have multiple content insertion points. In this particular example, local content is inserted into the E-Tree at VB 1008. The connection between VB 1008 and router/switch 1010 is an up connection. Some examples of local content include local channels (e.g., a public access channel produced by a city) or local content (e.g., advertisements specific to a particular metropolitan or geographic region).

In this particular example, the local content inserted at VB 1008 is only distributed to PBB-TE portion 1002b. The local content is not received at PBB-TE portion 1002a, nor at MPLS portion 1004. Content is propagated down an E-Tree from the point of insertion.

The other content insertion point in this example is VB 1006 where IPTV and other content is inserted.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a root node associated with a Metro Ethernet network;
    a first Virtual Bridge (VB), associated with the root node, configured to process Ethernet traffic using a first routing protocol;
    a second node associated with the Metro Ethernet network;
    a second VB, associated with the second node, configured to process Ethernet traffic and to allow interworking between at least the first routing protocol and a second routing protocol, the second routing protocol being substantially incompatible with the first routing protocol;
    two or more third nodes associated with the Metro Ethernet network;
    two or more third VBs associated with the third nodes, configured to process Ethernet traffic, wherein at least one of the third VBs is further configured to use the second routing protocol;
    wherein all of the VBs are configured to facilitate communicative coupling between all of the nodes, such that the root node is communicatively coupled to the second node, and the second node is communicatively coupled to the two or more third nodes;
    wherein the first VB is configured to permit transmission of Ethernet traffic from the root node to the two or more third nodes;
    wherein the second VB is configured to:
        permit transmission of Ethernet traffic from the root node to the two or more third nodes,
        prevent transmission of Ethernet traffic from one of the third nodes to another of the third nodes, and
        process Ethernet traffic addressed to the root node from one of the third nodes to determine whether to propagate transmission to the root node.

2. The system of claim 1, wherein each one of the third nodes is a leaf node.

3. The system of claim 1, wherein the first routing protocol uses the Multi Protocol Label Switching (MPLS) network standard and the second routing protocol uses the Provider Backbone Bridge Traffic Engineering (PBB_TE) network standard.

4. The system of claim 1, wherein the first routing protocol uses the Provider Backbone Bridge Traffic Engineering (PBB-TE) network standard and the second routing protocol uses the Multi Protocol Label Switching (MPLS) network standard.

5. The system of claim 3, wherein the first connection and/or the two or more second connections include a Label Switched Path (LSP) tunnel.

6. The system of claim 1, wherein the first connection and/or the two or more second connections are used to exchange Ethernet traffic associated with a plurality of E-Trees.

7. The system of claim 6, wherein a first group of Ethernet traffic corresponding to a first one of the plurality of E-Trees is assigned a first I-SID and a second group of Ethernet traffic corresponding to a second one of the plurality of E-Trees is assigned a second I-SID.

8. The system of claim 1, wherein:
    the first connection and/or the two or more second connections are used to exchange Ethernet traffic associated with a single E-Tree; and a first group of Ethernet traffic is assigned a first I-SID and a second group of Ethernet traffic is assigned a second I-SID.

9. The system of claim 1, wherein the first VB is further configured to receive IF traffic from a traffic source.

10. The system of claim 9, wherein the second VB is further configured to receive IF traffic from a second traffic source.

11. The system of claim 9, wherein the first VB is further configured to:
extract an IF address from the IF traffic received from the traffic source;
determine a MAC address based at least in part on the IF address;
and generate MAC traffic that includes the MAC address.

12. The system of claim 11, wherein the MAC address is unique.

13. The system of claim 1, wherein there exists a second connection between the second VB and one of the two or more third VBs and the second VB is further configured to:
receive Ethernet traffic from the one of the two or more third VBs via the second connection;
extract an address included in the received Ethernet traffic;
and store the address and an identifier associated with the second connection and/or the one of the two or more third VBs in a collection of stored information.

14. The system of claim 13, wherein storing includes updating an existing entry.

15. The system of claim 13, wherein storing includes creating a new entry.

16. The system of claim 13, wherein the second VB is further configured to:
receive Ethernet traffic from the first VB via the first connection;
extract a destination address from the Ethernet traffic received from the first VB;
and in the event the destination address is stored in the collection of stored information, sending the Ethernet traffic received from the first VB to a corresponding connection and/or VB based at least in part on an identifier that corresponds to the destination address.

17. The system of claim 1 further comprising a router, wherein:
there is a fourth connection between the router and the first VB;
and the fourth connection has been assigned an up direction from the point of view of the first VB.

18. The system of claim 1 further comprising a switch, wherein:
there is a fourth connection between the switch and the first VB;
and the fourth connection has been assigned an up direction from the point of view of the first VB.

19. The system of claim 1, wherein traffic received from an up connection is permitted to be forwarded to and up and/or down connection by a VB.

20. The system of claim 1, wherein a connection towards the root node, from the point of view of a VB associated with a leaf node or a transit node, is assigned an up direction.

21. The system of claim 1, wherein there is a plurality of routers connected to at least one node of the system via an up connection.

22. The system of claim 1, wherein there is a plurality of switches connected to at least one node of the system via an up connection.

23. A method, comprising:
determining a set of nodes associated with a Metro Ethernet network, including a root node, a second node, and two or more third nodes;
provisioning a first Virtual Bridge (VB), associated with the root node, configured to process Ethernet traffic using a first routing protocol;
provisioning a second VB, associated with the second node, configured to process Ethernet traffic and to allow interworking between at least the first routing protocol and a second routing protocol, the second routing protocol being substantially incompatible with the first routing protocol;
and provisioning two or more third VBs, associated with the two or more third nodes, configured to process Ethernet traffic, wherein at least one of the third VBs is further configured to use the second routing protocol;
wherein all the VBs are configured to facilitate communicative coupling between all of the nodes, such that the root node is communicatively coupled to the second node, and the second node is communicatively coupled to the two or more third nodes;
wherein the first VB is configured to permit transmission of Ethernet traffic from the root node to the two or more third nodes;
wherein the second VB is configured to:
permit transmission of Ethernet traffic from the root node to the two or more third nodes;
prevent transmission of Ethernet traffic from one of the third nodes to another of the third nodes, and
process Ethernet traffic addressed to the root node from one of the third nodes to determine whether to propagate transmission to the root node.

24. The method of claim 23, wherein determining includes receiving an indication of the root node and one or more leaf nodes.

25. The method of claim 24, wherein determining further includes automatically selecting a second node.

26. The method of claim 23, wherein provisioning the first VB occurs before provisioning of the second VB.

* * * * *